July 7, 1931. J. E. WRIGHT 1,813,721
METHOD AND APPARATUS FOR MANUFACTURING CASTINGS
Filed March 14, 1928 2 Sheets-Sheet 1
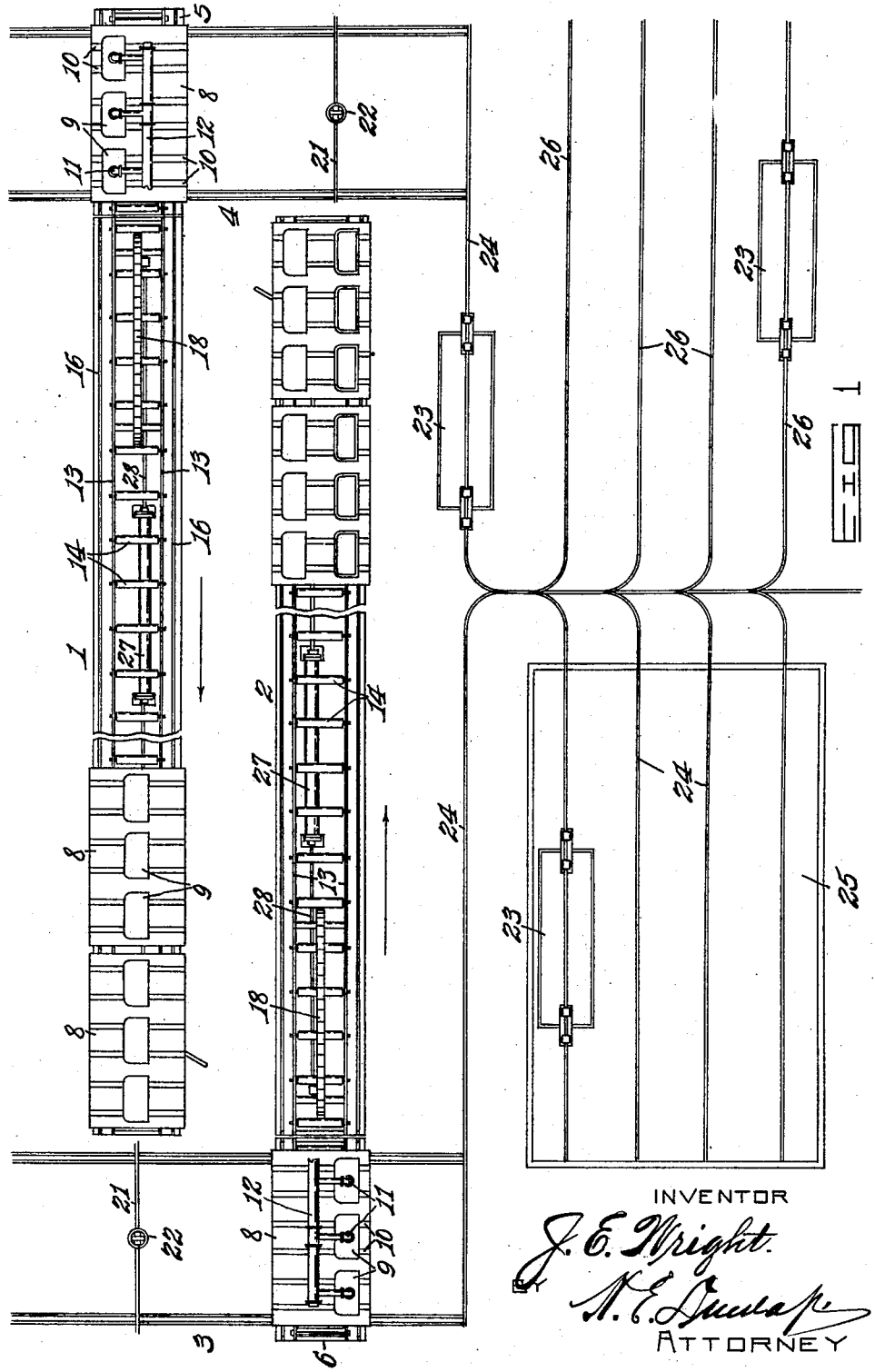
INVENTOR
J. E. Wright.
ATTORNEY

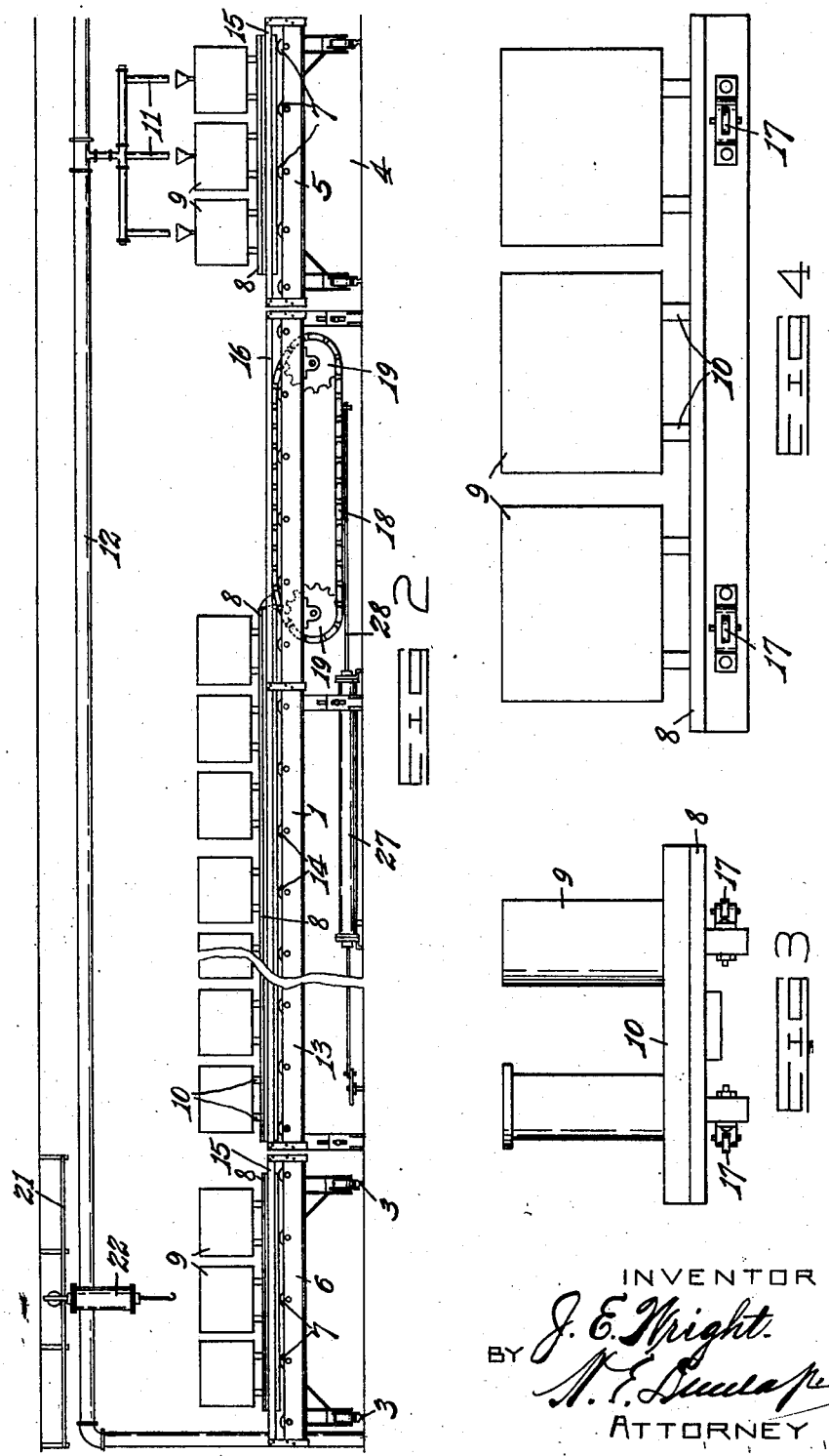

Patented July 7, 1931

1,813,721

UNITED STATES PATENT OFFICE

JOHN E. WRIGHT, OF WHEELING, WEST VIRGINIA

METHOD AND APPARATUS FOR MANUFACTURING CASTINGS

Application filed March 14, 1928. Serial No. 261,508.

This invention relates broadly to a method and apparatus for manufacturing castings, and more specifically to a method and apparatus for producing and handling sanitary pottery ware.

The primary object of the invention is to provide, in association with ware molds and means for introducing therein material to be molded, conveniently arranged means for moving the charged molds away from the charging station and for storing the molds, both charged and uncharged, in an orderly arrangement which not only assures that the charged molds will be successively handled in the performance of the required manufacturing operations, but provides at all times for convenient and orderly maintenance of all molds in out-of-the-way positions.

A further object is to provide means for performing mechanically and expeditiously much of the arduous labor, heretofore performed manually, of moving heavy molds to the charging station, charged molds from said station to the core-pulling station and for moving such molds to and from the various other points at which operations must be performed, and also whereby the various required manual operations and manipulations may be confined to a relatively small area or areas of the factory floor space, thereby not only to permit the workmen to confine their work to certain small areas, but also to restrict the collection of waste material, or débris, to such fractional portions of the factory floor.

With these and other objects in view, the invention resides in the method and the features of arrangement and construction of elements which will hereinafter be fully described, reference being had to the accompanying drawings, in which—

Figure 1 is a diagrammatic, or plan, view of a mechanical apparatus designed for carrying out my improved process or method;

Figure 2 is an enlarged sectional elevation taken on line 2—2, Fig. 1; and—

Figures 3 and 4 are enlarged views in end elevation and side elevation, respectively, of a mold carrying platform with molds and cores mounted thereon.

Referring to said drawings, 1 and 2 designate generally two conveyor tables which are arranged in suitably spaced parallel relation and which may have any appropriate length. Said tables are arranged between and have their opposite ends located adjacent to two opposite runways, or trackways, 3 and 4 which are disposed at right angles thereto and upon which are mounted for travel carriages, or trucks, 5 and 6. Each of said trucks has mounted thereon in parallel relation and in parallel alinement with its path of travel a plurality of rollers 7 adapted for receiving thereon a shiftable platform 8 of appropriate dimensions. Each platform is adapted to carry thereon one or more molds 9, either charged or empty, the apparatus herein disclosed being designed to handle the molds both filled and empty.

Each platform is preferably provided on its top face with a plurality of transversely disposed seating members 10 whereon the molds may rest and which serve to support such molds in elevated positions permitting air to circulate in a substantially unobstructed manner relative to the under sides of the latter.

Each truck is shiftable along its runway to and from a position wherein it underlies suitably arranged pouring spouts 11, as shown in Fig. 1 and at the right hand side in Fig. 2, through which is delivered to the thereby carried molds 9 the clay slip, or other semi-fluid material to be molded, such material being supplied in any appropriate manner, as through an overhead pipe 12 leading from a suitably located source of supply (not shown).

Each of the conveyor tables 1 and 2 comprises parallel frame members 13 carrying rollers 14 disposed in a common horizontal plane with the rollers 7 of the trucks 5 and 6. The platforms 8 are readily shiftable from the trucks to the conveyor tables, and vice versa, when the trucks ocupy alined relation to said tables. Parallel guide bars 15 carried by the trucks and similar guide bars 16 carried by the conveyor tables are designed to maintain the platforms 8 against lateral shifting upon the rollers. Cooperating with said guide bars are anti-friction rollers 17 carried by the opposite lateral edge portions of the platforms, as shown in Figs. 3 and 4.

In practice, following charging of the molds carried by the trucks 5 and 6, the mold supporting platforms are shifted therefrom to the rollers 14 of the tables 1 and 2, respectively. Such shifting may be effected either manually or by mechanical means, but, as herein shown, the shifting movement required to mount the platforms upon the tables must be performed manually.

For advancing the platforms along the conveyor tables a shifting mechanism is employed, said mechanism comprising in the present instance an endless chain 18 carried by suitably located sprocket wheels 19 and carrying a dog 20 which is adapted to engage the rear end of each platform, following delivery of the latter to the table, and to advance such platform, together with other platforms mounted on the table in advance thereof, a distance equal to the length of the individual platforms. Said chain, as herein shown, has the upper lap thereof disposed for travel over the tops of certain of the rollers 13, and the distance of travel of the chain in each actuation thereof following engagement of the dog 20 with the platform is equal to the platform length. Said chain 18 is advanced and retracted, as occasion requires, by means which, as herein shown, comprises a power cylinder 27 and a piston rod 28, the latter being suitably attached to said chain.

From the foregoing, it will be understood that each truck is cleared following each successive operation of charging the molds borne thereby and that the molds are advanced intermittently, or in a succession of steps, along the tables, which latter serve the double function of conveyors and places of storage for the charged molds while the contained ware is being permitted to mature.

It will further be understood that it is designed that the same operations shall be performed on both trucks and on both tables at the same time. Thus, when the foremost platform on the table 1 has reached the foremost end of the latter, the foremost platform of table 2 has likewise reached the foremost end of its table.

After the molds have remained upon the tables a sufficient length of time to effect solidification of the therein contained castings, the platforms are successively re-transferred from the tables to the trucks. Following such transfer of each platform, the mold cores are removed, this being effected either by hand, as when small castings are being produced, or mechanically, as when producing large size castings, such as closet tanks or lavatories. In the latter case, the trucks are moved along the runways to positions beneath a core pulling mechanism which, as herein shown, comprises a power hoist 22 mounted for shifting movement on an overhead trackway 21. Such power hoist may be operated by steam, compressed air or other suitable power. Following the core pulling and the turning of the ware, or pieces of ware, from their molds, and usually after a further treatment including the spraying of the cores with dust, said cores and molds, mounted upon platforms 8, are transferred to the tables for storage and are advanced in successive steps, as before, for returning them for re-use at the opposite ends.

The pieces of ware removed from the molds, as aforesaid, if in complete form, are immediately transferred to ware carriers 23 arranged for travel upon overhead trackways 24 and are shifted along the latter to a mechanical drier, or to a suitably located drying room 25 wherein they are thoroughly dried. Following such drying, the carriers are moved from the drying room along said trackways to other therewith communicating tracks 26 which may either lead to storage spaces or may themselves constitute places of storage for the ware, supported by the carriers 23.

Following removal from the drying room and prior to storing, the ware is finished in any usual or approved manner, as by sanding, or with sponge and pallet.

It may be, and is, desirable in some instances to finish or dress certain classes of ware prior to the drying thereof, while in the case of other classes, such as water closets and tanks, it is practicable to finish subsequent to the drying operation.

Where the articles of ware being produced are molded in a plurality of separate parts which require assembling, or sticking together, this assembling operation is performed following the removal of said parts from their molds and are then re-transferred to the tables 1 and 2 and are advanced over the latter as before for effecting setting of the assembled parts prior to transfer to the drying room.

In all cases, however, the various operations are being performed at opposite ends of the conveyor tables at substantially the same time and the two tables are constantly being utilized for the same purpose, be such purpose the transfer of charged molds, empty molds and cores, or maturing articles or pieces of ware.

From the foregoing it will be apparent that the method of handling is continuous. Upon receiving a charge to the right of Fig. 1, each platform carrying the charged molds is shifted to conveyor 1 and is carried therealong by intermittent steps to mature the ware. Having reached the opposite end of conveyor 1, each platform, following the time interval required to effect maturing of the ware in the molds, is shifted to the carriage of track 3 where the ware is removed from the molds, allowing the latter to remain on the platform. The carriage is then shifted along track 3 to a position in alinement with conveyor 2, following which it is returned along the latter to the right hand end for recharging of the thereby carried molds and a repetition of the handling described. The conveyor 2 is utilized precisely as is conveyor 1 and at the same time, charging of molds at the left of Fig. 1, the advance thereof over said conveyor 2, the removal of the ware and transfer of empty molds to table 1 occurring at the same time that the corresponding steps above described are performed. It will thus be noted that the conveyor tables serve both as places for storage of charged molds during the time required for maturing the ware and as places for storage for empty molds during such time.

It will be noted that the employment of the herein disclosed method results, first, in increased production in a given time with a resultant economy in the cost of manufacture, due largely to greater efficiency created by reason of the concentration of manual labor at two more or less fixed points; second, in timing the various operations with greatly increased precision, whereby is obtained a superior and generally uniform product; third, in greatly reducing the manual labor required in shifting the molds from place to place and in performing the various required operations; and, fourth, in maintaining the molds and molded articles in an orderly and convenient arrangement rather than in the usual non-orderly groupings which have heretofore kept the factory floor space in a more or less completely disordered condition.

What is claimed is—

1. The herein described method of handling material, which consists in charging work holders of two carriages at two separated stations, then in removing said holders from their carriages and advancing the same to the opposite carriages by travel in opposite directions along parallel paths and by a succession of steps during the time required to mature the work, then in removing the work from the opposite holders, then in moving said opposite carriages to positions alined with the paths affording reverse-direction of travel, removing said holders from said carriages and returning the same along said reverse paths by the aforesaid succession of steps to points adjacent to their respective charging stations, then shifting said returned holders to their carriages, and finally moving the latter for presenting the holders in position at their respective charging stations.

2. In a material handling apparatus, a pair of conveyor tables arranged in side by side relation, opposite substantially parallel runways adjacent the ends of the tables and at substantially right angles to the latter, carriages movable along said runways, mold supporting platforms removably mounted on the carriages, mold charging means associated with each runway and located adjacent to the receiving end of each table, and power hoists for the work over the opposite runways and located adjacent to the delivery ends of said tables.

3. In a material handling apparatus, two independent charging means located in spaced diagonal relation, a pair of power hoists adjacent the respective charging means and having a similarly spaced diagonal relation, each charging means with the non-adjacent hoist being alined in substantially parallel relation to the other, work molding means, means to mount the work molding means for movement to charge-receiving position, means to move the work molding means from said charging means throughout a predetermined period of time to the hoist with which it alines for effecting removal of the work, means to transfer the work-molding means from the hoist to the other charging means, and means to move the work molding means throughout a like period of time from said other charging means to the first named mounting means thereby to register with said other hoist for enabling the work molding means to be moved along said first named mounting means to be re-charged by said first named charging means.

4. In a material handling apparatus, a pair of relatively spaced and substantially parallel runways, a pair of relatively spaced substantially parallel conveyors extending at substantially right angles to the runways and across the space between the latter, a charging means and a hoist at the respective opposite ends of the conveyors, the hoists and the charging means being arranged in diagonal lines which intersect each other, and a material carrying means movable along the runways and the conveyors.

5. In a material handling apparatus, a pair of spaced and substantially parallel runways, a pair of spaced substantially parallel material-maturing conveyors extending at substantially right angles to the runways and across the space between the latter, a charging means and a hoist at the opposite ends of and substantially alined with each of the conveyors, the two hoists and the two charging means being respectively arranged in diagonal lines which intersect each other, material conveying means movable along said conveyors, and means to and from which the material carrying means are transferable with respect to said conveyors, the last mentioned means being movable along said runways for transferring the material-carrying means between, to and from operative relation to said hoists and said charging means.

6. In a material handling apparatus, a pair of substantially parallel material-maturing conveyors, a charging means at one end of each conveyor and a hoist at the opposite end of each conveyor, runways at the opposite ends of and at right angles to the conveyors, a carriage movable along each runway, and work holding means shiftable from each carriage occupying charge-receiving position to the adjacent conveyor and re-shiftable from such conveyor to the opposite carriage occupying operative relation to the adjacent hoist.

7. The herein described method of handling material which consists in charging two separated work carriers, then in advancing said carriers in opposite directions along parallel paths, removing the charge from each of the carriers at a point adjacent to the charging point of the other carrier then in moving the empty carriers in a path substantially at right angles to their prior paths of movement and in opposite directions to each other, then in moving the carriers in opposite directions in a path substantially parallel to their initial paths of movement, and finally in moving the carriers in opposite directions at substantially right angles to their last named paths to re-position them at their charging points.

In testimony whereof, I affix my signature.

JOHN E. WRIGHT.